(12) United States Patent
Tanaka et al.

(10) Patent No.: US 10,655,860 B2
(45) Date of Patent: May 19, 2020

(54) THRUST INCREASING DEVICE

(71) Applicant: IHI Corporation, Koto-ku (JP)

(72) Inventors: Shinji Tanaka, Tokyo (JP); Jun Hosoi, Tokyo (JP); Katsuyoshi Takahashi, Tokyo (JP); Nagayoshi Hiromitsu, Tokyo (JP)

(73) Assignee: IHI Corporation, Koto-ku (JP)

( * ) Notice: Subject to any disclaimer, the term of this patent is extended or adjusted under 35 U.S.C. 154(b) by 432 days.

(21) Appl. No.: 15/288,187

(22) Filed: Oct. 7, 2016

(65) Prior Publication Data
US 2017/0023252 A1    Jan. 26, 2017

Related U.S. Application Data

(63) Continuation of application No. PCT/JP2015/064724, filed on May 22, 2015.

(30) Foreign Application Priority Data

May 23, 2014    (JP) .................................. 2014-107048

(51) Int. Cl.
*F23R 3/58* (2006.01)
*F23R 3/18* (2006.01)
(Continued)

(52) U.S. Cl.
CPC .................. *F23R 3/58* (2013.01); *F02K 3/10* (2013.01); *F23R 3/045* (2013.01); *F23R 3/18* (2013.01);
(Continued)

(58) Field of Classification Search
CPC .... F23R 3/18; F23R 3/045; F23R 3/12; F23D 11/406; F02K 3/10; F02K 3/08
See application file for complete search history.

(56) References Cited

U.S. PATENT DOCUMENTS 3,747,345 A    7/1973 Markowski
4,185,458 A *  1/1980 Ernst .................. F23R 3/18
                                              60/749

(Continued)

FOREIGN PATENT DOCUMENTS

JP    6-193509    7/1994
JP    8-165952    6/1996
(Continued)

OTHER PUBLICATIONS

International Search Report dated Aug. 4, 2015 in PCT/JP2015/064724 filed on May 22, 2015 (with English translation).

(Continued)

*Primary Examiner* — Todd E Manahan
*Assistant Examiner* — Katheryn A Malatek
(74) *Attorney, Agent, or Firm* — Oblon, McClelland, Maier & Neustadt, L.L.P.

(57) ABSTRACT

A thrust increasing device includes: a fuel injector that ejects fuel toward a jet flow; an ignition device that is disposed downstream from the fuel injector; a cylindrical duct that surrounds a combustion region; a flame holder that is disposed in the duct; and a swirling flow generating part that maintains an axial flow of the jet flow in an axial direction of the duct in an outer region of the duct in a radial direction inside the duct and that converts the jet flow to a swirling flow centered on an axis of the duct in an inner region of the duct in the radial direction inside the duct.

5 Claims, 4 Drawing Sheets

(51) Int. Cl.
*F02K 3/10* (2006.01)
*F23R 3/04* (2006.01)
*F23R 3/28* (2006.01)

(52) U.S. Cl.
CPC ............... *F23R 3/28* (2013.01); *Y02T 50/671* (2013.01); *Y02T 50/675* (2013.01)

(56) References Cited

U.S. PATENT DOCUMENTS

| | | | |
|---|---|---|---|
| 5,129,226 A | 7/1992 | Bigelow et al. | |
| 5,396,761 A | 3/1995 | Woltmann et al. | |
| 2005/0198940 A1* | 9/2005 | Koshoffer | F02K 1/06 60/204 |
| 2007/0039327 A1* | 2/2007 | Blanchard | F02K 3/10 60/765 |
| 2009/0260366 A1 | 10/2009 | Bunel et al. | |

FOREIGN PATENT DOCUMENTS

| | | |
|---|---|---|
| JP | 2004-277647 | 10/2004 |
| JP | 2011-43117 | 3/2011 |
| JP | 2011-43297 | 3/2011 |

OTHER PUBLICATIONS

Written Opinion dated Aug. 4, 2015 in PCT/JP2015/064724 filed on May 22, 2015.

\* cited by examiner

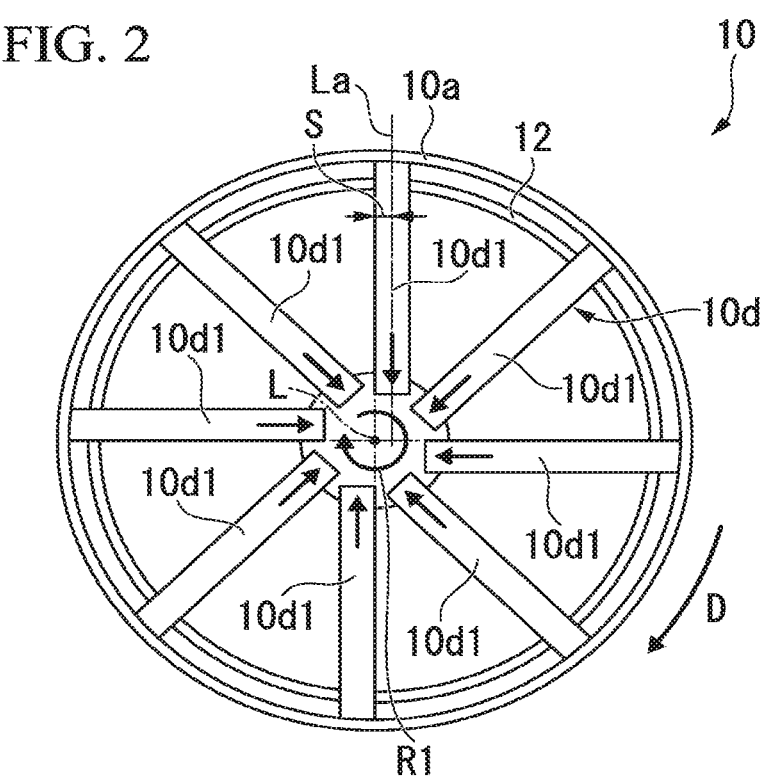

THRUST INCREASING DEVICE

This application is a Continuation of International Application No. PCT/JP2015/064724, filed on May 22, 2015, claiming priority based on Japanese Patent Application No. 2014-107048, filed on May 23, 2014, the contents of which is incorporated herein by reference in their entirety.

TECHNICAL FIELD

Embodiments described herein relates to a thrust increasing device.

BACKGROUND ART

For example, as represented in Patent Documents 1 and 2, a thrust increasing device is mounted on a jet engine, and obtains thrust by supplying fuel to a jet flow and burning the fuel again. Such a thrust increasing device is provided with a fuel injector that ejects fuel into a jet flow, an ignition device that is disposed downstream from the fuel injector, a cylindrical duct that surrounds a combustion region, and a flame holder that is disposed in the duct.

CITATION LIST

Patent Document

[Patent Document 1]
 Japanese Unexamined Patent Application, First Publication No. 2011-43297
[Patent Document 2]
 U.S. Pat. No. 5,129,226

SUMMARY

Technical Problem

Meanwhile, in the thrust increasing device, to sufficiently complete a combustion reaction within the high-speed jet flow, it is necessary to secure a sufficiently long stay time of the fuel injected into the combustor. For this reason, the combustor that is sufficiently long in a flow direction of the jet flow is generally provided. Such a combustor is provided inside the duct surrounding the combustion region in the thrust increasing device. Therefore, in the conventional jet engine, the duct of the thrust increasing device is lengthened. Thus, the weight of the entire engine increases, and performance (a thrust-to-weight ratio) of the engine decreases.

The present disclosure is conceived in view of the aforementioned circumstances, and an object of the present disclosure is to provide a thrust increasing device that reduces the length of a duct surrounding a combustion region to lighten a jet engine.

Solution to Problem

As means for solving the above circumstances, the present disclosure adopts the following constitution.

A first aspect of the present disclosure is a thrust increasing device, which includes: a fuel injector which ejects fuel toward a jet flow; an ignition device disposed downstream from the fuel injector; a cylindrical duct which surrounds a combustion region; a flame holder disposed in the duct; and a swirling flow generating part which maintains a flow of the jet flow in an axial direction of the duct in an outer region of the duct in a radial direction inside the duct and converts the jet flow to a swirling flow centered on an axis of the duct in an inner region of the duct in the radial direction inside the duct.

In a second aspect of the present disclosure, the swirling flow generating part is made up of a plurality of radial gutters which are arranged around the axis of the duct in an annular shape and each of which injects air toward a place displaced from the axis of the duct by the same distance when viewed in the axial direction of the duct.

In a third aspect of the present disclosure, the radial gutters include pipe parts that inject air toward places displaced from the axis of the duct by the same distance.

In a fourth aspect of the present disclosure, axes of the pipe parts are directed toward places displaced from the axis of the duct by the same distance.

In a fifth aspect of the present disclosure, injection openings of the pipe parts are inclined toward places displaced from the axis of the duct by the same distance.

In a sixth aspect of present disclosure, the radial gutters include pipe parts that are directed toward the axis of the duct and inject air, and lid parts that are attached to injection openings of the pipe parts and bias the air injected from the pipe parts toward places displaced from the axis of the duct by the same distance.

According to the present disclosure, the swirling flow is formed in the duct by the swirling flow generating part. Because such a swirling flow is formed, a mixing speed at which the jet flow and the fuel are mixed is increased. As a result, the fuel can be burnt in a short time, and the combustion region can be shortened. Therefore, according to the present disclosure, the length of the duct surrounding the combustion region in the thrust increasing device can be shortened, and the weight of a jet engine can be reduced.

BRIEF DESCRIPTION OF DRAWINGS

FIG. 2 is a view when viewed in an arrow direction of line A-A of FIG. 1.

DESCRIPTION OF EMBODIMENTS

Figure 1:
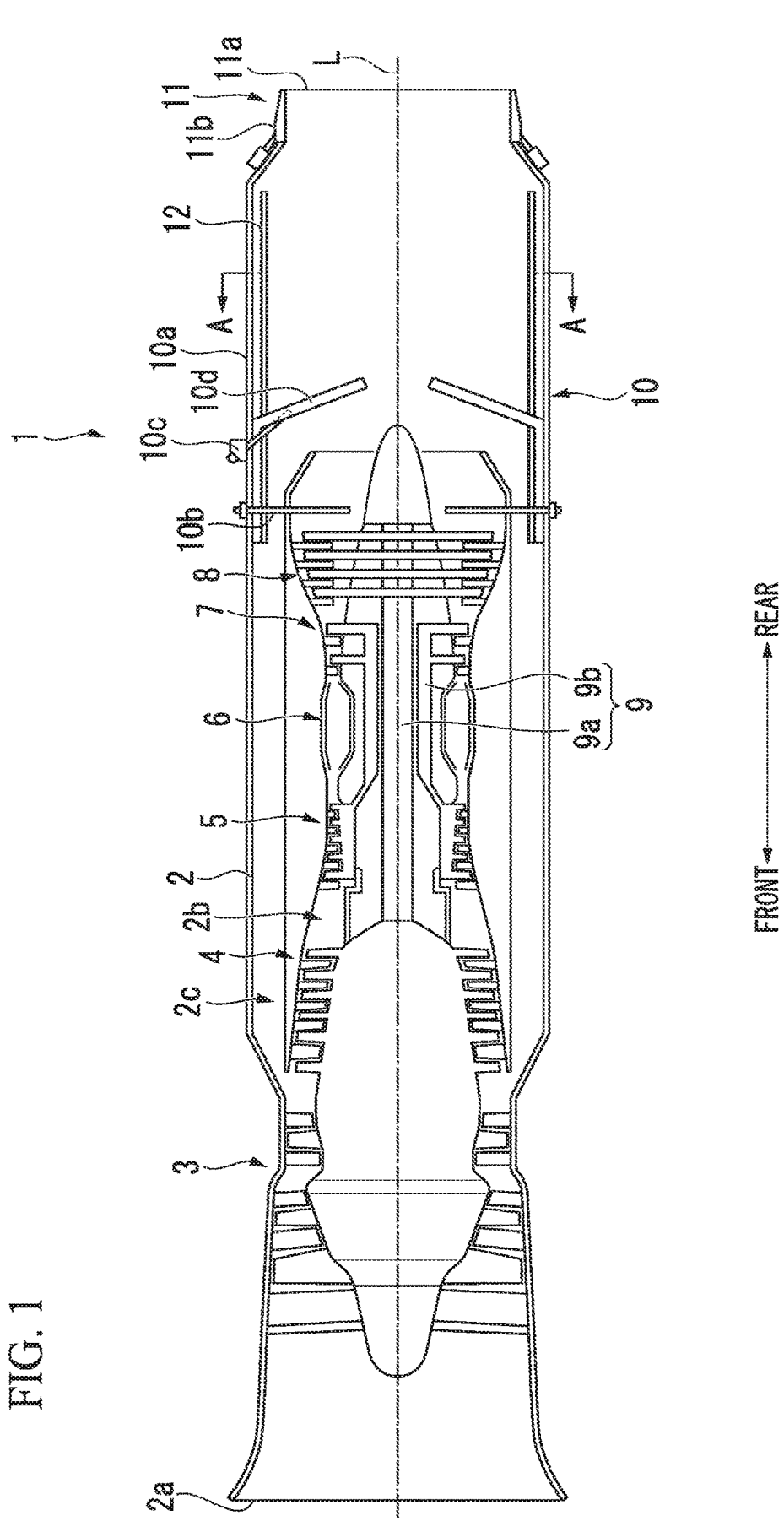
FIG. 1 is a sectional view schematically showing a jet engine provided with a thrust increasing device that is an embodiment of the present disclosure.

Hereinafter, an embodiment of a thrust increasing device according to the present disclosure will be described with reference to the drawings. In the drawings below, a scale of each member is adequately changed such that each member has a recognizable size.

FIG. 1 is a sectional view schematically showing a jet engine 1 provided with a thrust increasing device 10 of the present embodiment. As shown in this figure, the jet engine 1 is a turbofan engine that has a shape that becomes approximately rotationally symmetric with respect to an axis L, and is provided with a casing 2, a fan 3, a low-pressure compressor 4, a high-pressure compressor 5, a combustor 6, a high-pressure turbine 7, a low-pressure turbine 8, a shaft 9, a thrust increasing device 10, a variable exhaust nozzle (a nozzle) 11, and a liner 12.

The casing 2 is a cylindrical member in which the fan 3, the low-pressure compressor 4, the high-pressure compressor 5, the combustor 6, the high-pressure turbine 7, the low-pressure turbine 8, the shaft 9, and the thrust increasing device 10 are housed. An opening of one end side (a front side shown in FIG. 1) of the casing 2 serves as an intake 2a that introduces air into the jet engine 1, and the variable exhaust nozzle 11 is provided at an opening of the other end side (a rear side shown in FIG. 1) of the casing 2. A partial region of a downstream side of the casing 2 functions as a duct 10a of the thrust increasing device 10.

Also, a core flow passage 2b that is a flow passage provided at an inner side of the casing 2 in a radial direction and a bypass flow passage 2c that is a flow passage provided at an outer side of the casing 2 in the radial direction are formed inside the casing 2. As shown in FIG. 1, the inside of the casing 2 is partitioned in the radial direction downstream from the fan 3, and thereby the core flow passage 2b and the bypass flow passage 2c are provided. The core flow passage 2b is a flow passage that guides air to the combustor 6 and guides a combustion gas discharged from the combustor 6 toward the thrust increasing device 10 via the high-pressure turbines 7 and low-pressure turbine 8. The bypass flow passage 2c is a flow passage that guides air, which is sent from the fan 3 under pressure, toward the thrust increasing device 10 by bypassing the low-pressure compressor 4, the high-pressure compressor 5, the combustor 6, the high-pressure turbine 7, and the low-pressure turbine 8.

The fan 3 is disposed furthest upstream inside the casing 2. The fan 3 is configured such that a rotor blade row made up of rotor blades fixed to a low-pressure shaft 9a (to be described below) of the shaft 9 and a stator vane row made up of stator vanes fixed to the casing 2 are alternately arranged in a plurality of stages. Due to rotation of the rotor blades caused by rotation of the shaft 9, the fan 3 sends air introduced from the intake 2a downstream under pressure.

The low-pressure compressor 4 is disposed furthest upstream in the core flow passage 2h. The low-pressure compressor 4 is configured such that a rotor blade row made up of rotor blades fixed to the low-pressure shaft 9a of the shaft 9 and a stator vane row made up of stator vanes fixed to an inner wall surface of the core flow passage 2b are alternately arranged in a plurality of stages. Due to rotation of the rotor blades caused by the rotation of the shaft 9, the low-pressure compressor 4 compresses air introduced to the core flow passage 2b with the rotor blades while rectifying the air with the stator vanes.

The high-pressure compressor 5 is disposed downstream from the low-pressure compressor 4 in the core flow passage 2b. The high-pressure compressor 5 is configured such that a rotor blade row made up of rotor blades fixed to a high-pressure shaft 9b (to be described below) of the shaft 9 and a stator vane row made up of stator vanes fixed to the inner wall surface of the core flow passage 2b are alternately arranged in a plurality of stages. Due to rotation of the rotor blades caused by the rotation of the shaft 9, the high-pressure compressor 5 further compresses the air compressed by the low-pressure compressor 4 with the rotor blades while rectifying the air with the stator vanes.

The combustor 6 is disposed downstream from the high-pressure compressor 5 in the core flow passage 2b. The combustor 6 is provided with a fuel nozzle and an ignition device that are not shown, and produces a combustion gas by burning a mixture comprised of fuel and the compressed air produced by the high-pressure compressor 5.

The high-pressure turbine 7 is disposed downstream from the combustor 6 in the core flow passage 2b. The high-pressure turbine 7 is configured such that a rotor blade row made up of rotor blades fixed to the high-pressure shaft 9b of the shaft 9 and a stator vane row made up of stator vanes fixed to the inner wall surface of the core flow passage 2b are alternately arranged in a plurality of stages. As the combustion gas produced by the combustor 6 is received by the rotor blades and is rectified by the stator vanes, the rotor blades are rotated, and the high-pressure turbine 7 rotates the high-pressure shaft 9b of the shaft 9.

The low-pressure turbine 8 is disposed downstream from the high-pressure turbine 7 in the core flow passage 2b. The low-pressure turbine 8 is configured such that a rotor blade row made up of rotor blades fixed to the low-pressure shaft 9a of the shaft 9 and a stator vane row made up of stator vanes fixed to the inner wall surface of the core flow passage 2b are alternately arranged in a plurality of stages. As the combustion gas passing through high-pressure turbine 7 is received by the rotor blades and rectified by the stator vanes, the rotor blades are rotated, and the low-pressure turbine 8 rotates the low-pressure shaft 9a of the shaft 9.

The shaft 9 is provided with the low-pressure shaft 9a at the inner side in the radial direction, and the high-pressure shaft 9b at the outer side in the radial direction, and has a dual shaft structure in which these low-pressure shaft 9a and high-pressure shaft 9b can be individually rotated about the same axis. The rotor blades of the low-pressure turbine 8, the rotor blades of the low-pressure compressor 4, and the rotor blades of the fan 3 are fixed to the low-pressure shaft 9a. Such a low-pressure shaft 9a transmits rotational power, which is produced as the rotor blades of the low-pressure turbine 8 receive the combustion gas and are rotated, to the rotor blades of the low-pressure compressor 4 and the rotor blades of the fan 3, and rotates the rotor blades of the low-pressure compressor 4 and the rotor blades of the fan 3. The rotor blades of the high-pressure turbine 7 and the rotor blades of the high-pressure compressor 5 are fixed to the high-pressure shaft 9b. Such a high-pressure shaft 9b transmits rotational power, which is produced as the rotor blades of the high-pressure turbine 7 receive the combustion gas and are rotated, to the rotor blades of the high-pressure compressor 5, and rotates the rotor blades of the high-pressure compressor 5.

The thrust increasing device 10 is disposed downstream from the low-pressure turbine 8. The thrust increasing device 10 is a device that increases thrust by burning the fuel again using oxygen contained in a mixture of the combustion gas passing through the low-pressure turbine 8 and the air passing through the bypass flow passage 2c, and is provided with a duct 10a, a fuel injector 10b, an ignition device 10c, a flame holder 10d, and so on.

The duct 10a is integrated with the casing 2, and is a cylindrical part surrounding a combustion region in the thrust increasing device 10. An axis of the duct 10a is identical with the axis L of the jet engine 1. The fuel injector 10b is provided downstream from the low-pressure turbine 8 in the duct 10a, and injects the fuel into the jet flow passing through the low-pressure turbine 8. The ignition device 10c is provided downstream from the fuel injector 10b in the duct 10a, and performs ignition on a mixture in which the fuel and the jet flow are mixed.

The flame holder 10d is disposed downstream from the fuel injector 10b in the duct 10a, and is provided at approximately the same position as the ignition device 10c in a direction in which the axis L extends. The flame holder 10d maintains flames in the duct 10a. The flame holder 10d will be described later.

The variable exhaust nozzle 11 is provided at the downstream end of the casing 2, and injects the combustion gas exhausted from the core flow passage 2b and the air flow exhausted from the bypass flow passage 2c in the rear of the jet engine 1. The variable exhaust nozzle 11 is provided with a nozzle opening end 11a that injects the combustion gas and the air flow, and a movable part (a fluid resistance adjusting part or an opening area varying mechanism) 11b that changes an opening area of the nozzle opening end 11a. The movable part 11b is provided with flaps that are arranged in a circumferential direction of the nozzle opening end 11a, actuators that adjust angles of the flaps, and so on, and adjusts fluid resistance at the nozzle opening end 11a by changing the opening area of the nozzle opening end 11a.

The liner 12 is a cylindrical partition that is provided in the duct 10a of the thrust increasing device 10, and forms a flow passage along which low-temperature air with which the fuel is not mixed and which is not compressed flows from the bypass flow passage 2c.

FIG. 2 is a view when viewed in an arrow direction of line A-A of FIG. 1, and shows the flame holder 10d of the thrust increasing device 10 of the present embodiment. The flame holder 10d is provided with a plurality of radial gutters 10d1 that are radially disposed about the axis L. Each of the radial gutters 10d1 is formed of a pipe part, one end of which is disposed in a gap between the liner 12 and the duct 10a, and the other end of which is disposed in the duct 10a. The radial gutters 10d1 are cooled by causing low-temperature air flowing through the gap between the liner 12 and the duct 10a to flow to the inside thereof as cooling air.

Also, in the present embodiment, as shown in FIG. 2, the plurality of pipe parts forming the radial gutters 10d1 are arranged about the axis L of the duct 10a in an annular shape at regular intervals in a circumferential direction of the duct 10a. Further, each of the pipe parts is disposed such that its own central line La (an axis of the pipe part) is directed toward a place displaced from the axis L of the duct 10a by the same distance when viewed in an axial direction of the duct 10a. To be specific, each pipe part is disposed such that the central line La thereof (the axis of the pipe part) is shifted (displaced) from the axis L of the duct 10a by a constant distance S to one side along the circumferential direction of the duct 10a (to a side indicated by an arrow D in FIG. 2) when viewed in the axial direction of the duct 10a. Each of these radial gutters 10d1 injects air toward the place displaced by the same distance from the axis L of the duct 10a when viewed in the axial direction of the duct 10a. As the air is injected from tips of the radial gutters 10d1, a swirling flow R1 swirling about the axis L in the direction of the arrow D is formed in the center of the radial gutters 10d1.

Figure 3A:
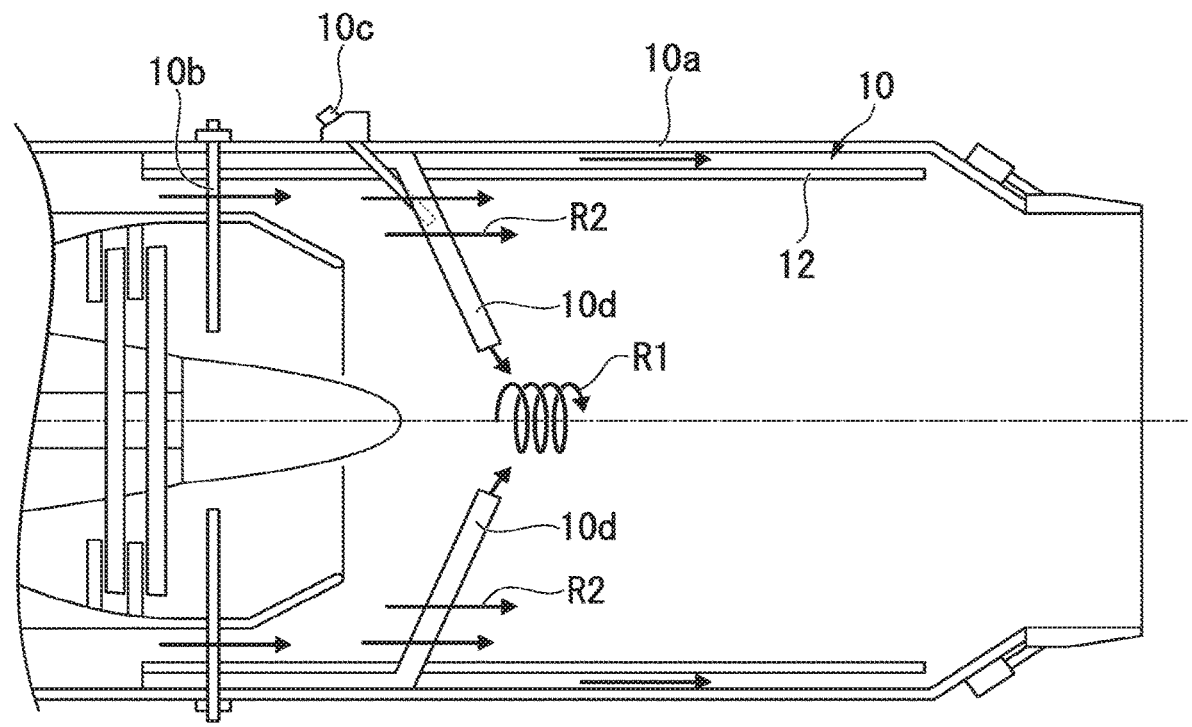
FIG. 3A is an enlarged view of a longitudinal section including the thrust increasing device of the jet engine in order to describe a swirling flow formed by radial gutters provided for the thrust increasing device that is an embodiment of the present disclosure.
Figure 3B:
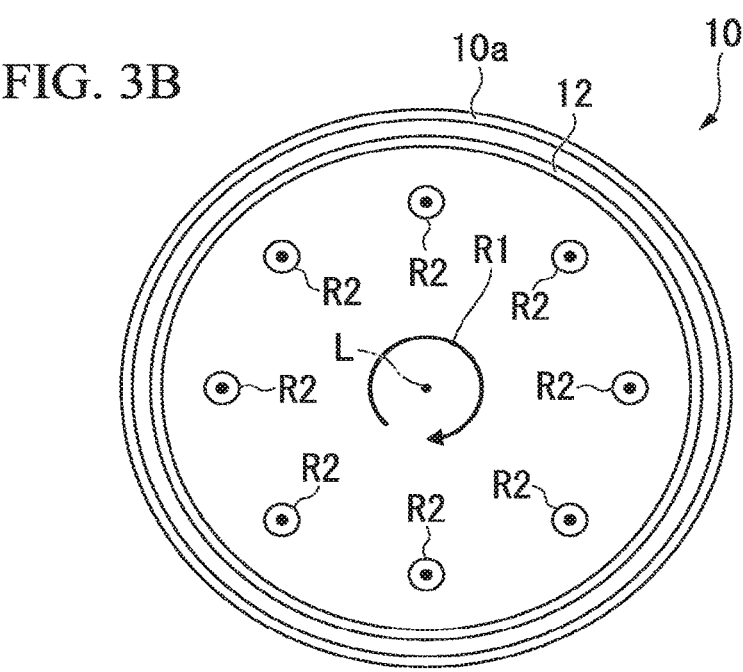
FIG. 3B is a schematic view when a duct and a liner are viewed in an axial direction in order to describe the swirling flow formed by the radial gutters provided for the thrust increasing device that is an embodiment of the present disclosure.

FIGS. 3A and 3B are schematic views showing the swirling flow R1 formed by the radial gutters 10d1. FIG. 3A is an enlarged view of a longitudinal section including the thrust increasing device 10 of the jet engine, and FIG. 3B is a schematic view when the duct 10a and the liner 12 are viewed in the axial direction. As shown in these figures, in the present embodiment, the swirling flow R1 formed as the air is injected from each of the radial gutters 10d1 is formed only in an inner region of the duct 10a in the radial direction. As a result, a flow of an outer region of the duct 10a in the radial direction becomes an axial flow R2.

That is, in the present embodiment, when viewed in the axial direction of the duct 10a, the plurality of radial gutters 10d1 maintain an axial flow of the jet flow on an outer region inside the duct 10a in the radial direction, and form the jet flow on an inner region inside the duct 10a in the radial direction as a swirling flow centered on the axis L of the duct 10a. Namely, in the present embodiment, the plurality of radial gutters 10d1 function as a swirling flow generating part of the present disclosure.

In the jet engine 1, the air is introduced from the outside through the intake 2a of the casing 2 by driving the fan 3, and the introduced air is distributed into the core flow passage 2b and the bypass flow passage 2c. The air flowing through the core flow passage 2b is compressed by the low-pressure compressor 4 and the high-pressure compressor 5, is then supplied to the combustor 6, and is burnt along with the fuel. Thereby, the combustion gas is produced, and the combustion gas flows through the core flow passage 2b, and is ejected from the variable exhaust nozzle 11. Also, the air flowing through the bypass flow passage 2c flows by bypassing the low-pressure compressor 4, the high-pressure compressor 5, the combustor 6, the high-pressure turbine 7, and the low-pressure turbine 8, and is injected from the variable exhaust nozzle 11 along with the combustion gas. In this way, the combustion gas and the air flowing through the bypass flow passage 2c are ejected from the variable exhaust nozzle 11, and thereby thrust is obtained.

When the combustion gas flowing through the core flow passage 2b passes through the high-pressure turbine 7, the rotor blades of the high-pressure turbine 7 are rotated and driven, and rotational power is produced. This rotational power is transmitted to the high-pressure compressor 5 through the high-pressure shaft 9b of the shaft 9, and thereby the rotor blades of the high-pressure compressor 5 are rotated. Also, when the combustion gas flowing through the core flow passage 2b passes through the low-pressure turbine 8, the rotor blades of the low-pressure turbine 8 are rotated and driven, and rotational power is produced.

Also, when there is a need for great thrust, the thrust increasing device 10 supplies the fuel to the combustion gas passing through the high-pressure turbine 7 and the low-pressure turbine 8, and burns the combustion gas again. Thereby, the thrust is increased. At this point, since a flow rate of exhaust gas per volume is increased by the afterburning of the combustion gas, the opening area of the nozzle opening end 11a is widened by the movable part 11b such that the fluid resistance at the nozzle opening end 11a is not increased.

According to the thrust increasing device 10 of the present embodiment as described above, the swirling flow R1 is formed in the duct 10a by the plurality of radial gutters 10d1. Because the swirling flow R1 is formed, a mixing speed at which the jet flow and the fuel injected from the fuel injector 10b are mixed is increased. Thereby, the fuel can be burnt in a short time, and the combustion region can be shortened. Therefore, the length of the thrust increasing device 10 can be shortened, and the weight of the jet engine 1 can be reduced.

Also, the plurality of radial gutters 10d1 are to be conventionally installed as constituent elements of the flame holder 10d. For this reason, because the swirling flow R1 is formed by the radial gutters 10*d*1, the swirling flow R1 can be formed without adding a new mechanism to the thrust increasing device 10.

Further, in the thrust increasing device 10 of the present embodiment, the radial gutters 10*d*1 are made up of the pipe parts in which the central lines La of the pipe parts are directed toward places displaced from the axis L of the duct 10*a* by the same distance. For this reason, the radial gutters 10*d*1 can be formed in a simple linear shape, and the thrust increasing device 10 can be obtained at a low cost.

While the preferred embodiment of the present disclosure has been described with reference to the attached drawings, it goes without saying that the present disclosure is not limited to the above embodiment. All the shapes and combinations of the components shown in the aforementioned embodiment are only examples, and can be variously modified based on design requirements within the scope of the present disclosure as claimed.

Figure 4A:
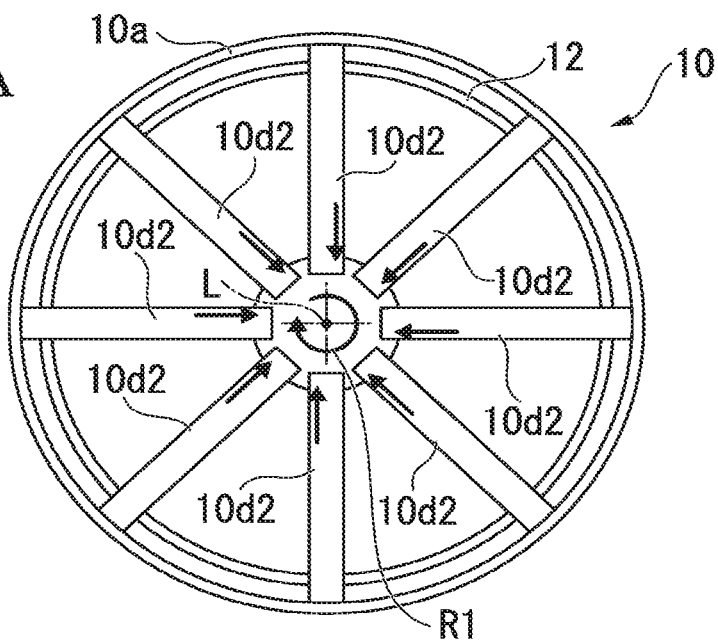
FIG. 4A is a schematic view showing a modification of the thrust increasing device that is an embodiment of the present disclosure.
Figure 4B:
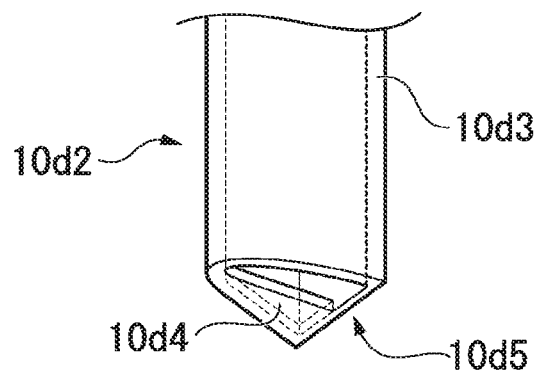
FIG. 4B is a schematic view showing a modification of the thrust increasing device that is an embodiment of the present disclosure.
Figure 4C:
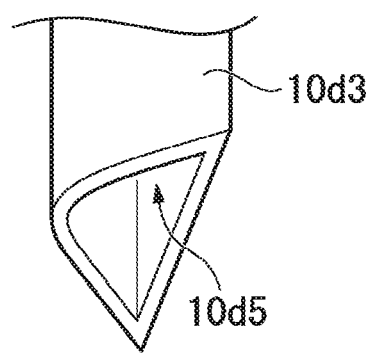
FIG. 4C is a schematic view showing a modification of the thrust increasing device that is an embodiment of the present disclosure.

For example, in the above embodiment, the constitution in which the radial gutters 10*d*1 are made up of the pipe parts in which the central lines La of the pipe parts are directed toward places displaced from the axis L of the duct 10*a* by the same distance is adopted. However, the present disclosure is not limited to this constitution. For example, as shown in FIGS. 4A and 4B, the thrust increasing device 10 may be configured to be provided with radial gutters 10*d*2 each having a pipe part 10*d*3 that is directed toward the axis L of the duct 10*a* and injects air, and a lid part 10*d*4 that is attached to an injection opening of the pipe part 10*d*3 and biases the air injected from the pipe part 10*d*3 toward a place displaced from the axis L of the duct 10*a* by the same distance. To be specific, as a part of the injection opening 10*d*5 of the pipe part 10*d*3 is blocked by the lid part 10*d*4, the air injected from the pipe part 10*d*3 leans toward a side of the injection opening 10*d*5 which is opposite to the attachment side of the lid part 10*d*4. Also, as shown in FIG. 4C, the injection openings 10*d*5 of the aforementioned pipe parts 10*d*3 may be inclined to direct the air toward places displaced from the axis L by the same distance. In this case, the air injected from the pipe part 10*d*3 leans to an opening face side of the inclined injection opening 10*d*5. Even if such a constitution is adopted, the same swirling flow R1 as in the above embodiment can be formed.

Also, in the above embodiment, the constitution in which the swirling flow R1 is formed by the plurality of radial gutters 10*d*1 installed as the components of the flame holder 10*d* has been described. However, the present disclosure is not limited to this constitution, and a constitution in which a swirling flow generating part is provided apart from the flame holder 10*d* may be adopted.

INDUSTRIAL APPLICABILITY

It is possible to shorten the length of the duct surrounding the combustion region in the thrust increasing device, and to reduce the weight of the jet engine.

What is claimed is:

1. A thrust increasing device comprising:
   a fuel injector which ejects fuel toward a jet flow;
   an ignition device disposed downstream from the fuel injector;
   a cylindrical duct which surrounds a combustion region;
   a flame holder disposed in the cylindrical duct; and
   a swirling flow generating part which maintains a flow of the jet flow in an axial direction of the cylindrical duct in an outer region of the cylindrical duct in a radial direction inside the cylindrical duct and converts the jet flow to a swirling flow centered on an axis of the cylindrical duct in an inner region of the cylindrical duct in the radial direction inside the cylindrical duct, wherein
   the swirling flow generating part is made up of a plurality of radial gutters which are arranged around the axis of the cylindrical duct in an annular shape,
   each of the plurality of the radial gutters includes a pipe part, inner ends of the pipe parts in the radial direction are separate and spaced apart from each other, and the pipe parts inject air toward locations displaced from the axis of the cylindrical duct by equal distances when viewed in the axial direction of the cylindrical duct, and
   center axes of the pipe parts do not intersect the axis of the cylindrical duct when viewed in the axial direction of the cylindrical duct.

2. The thrust increasing device according to claim 1, wherein the center axes of the pipe parts are directed toward the locations displaced from the axis of the cylindrical duct by the equal di stances.

3. The thrust increasing device according to claim 1, wherein injection openings of the pipe parts are inclined toward the locations displaced from the axis of the cylindrical duct by the equal distances.

4. A thrust increasing device comprising:
   a fuel injector which ejects fuel toward a jet flow;
   an ignition device disposed downstream from the fuel injector;
   a cylindrical duct which surrounds a combustion region;
   a flame holder disposed in the cylindrical duct; and
   a swirling flow generating part which maintains a flow of the jet flow in an axial direction of the cylindrical duct in an outer region of the cylindrical duct in a radial direction inside the cylindrical duct and converts the jet flow to a swirling flow centered on an axis of the cylindrical duct in an inner region of the cylindrical duct in the radial direction inside the cylindrical duct, wherein
   the swirling flow generating part is made up of a plurality of radial gutters which are arranged around the axis of the cylindrical duct in an annular shape,
   each of the plurality of the radial gutters includes a pipe part that is directed toward the axis of the cylindrical duct and injects air, inner ends of the pipe parts in the radial direction are separate and spaced apart from each other, and a lid part that is attached to an injection opening of the pipe part, and the lid parts bias the air injected from the pipe parts toward locations displaced from the axis of the cylindrical duct by equal distances when viewed in the axial direction of the cylindrical duct, and
   center axes of the pipe parts do not intersect the axis of the cylindrical duct when viewed in the axial direction of the cylindrical duct.

5. The thrust increasing device according to claim 1, further comprising:
   a cylindrical liner provided in the cylindrical duct and forms a flow passage;
   wherein an outer end in the radial direction of each of the radial gutters is disposed in a gap between the cylindrical duct and the cylindrical liner, and an inner end in the radial direction of each of the radial gutters is disposed in the cylindrical duct.

* * * * *